Patented Mar. 27, 1928.

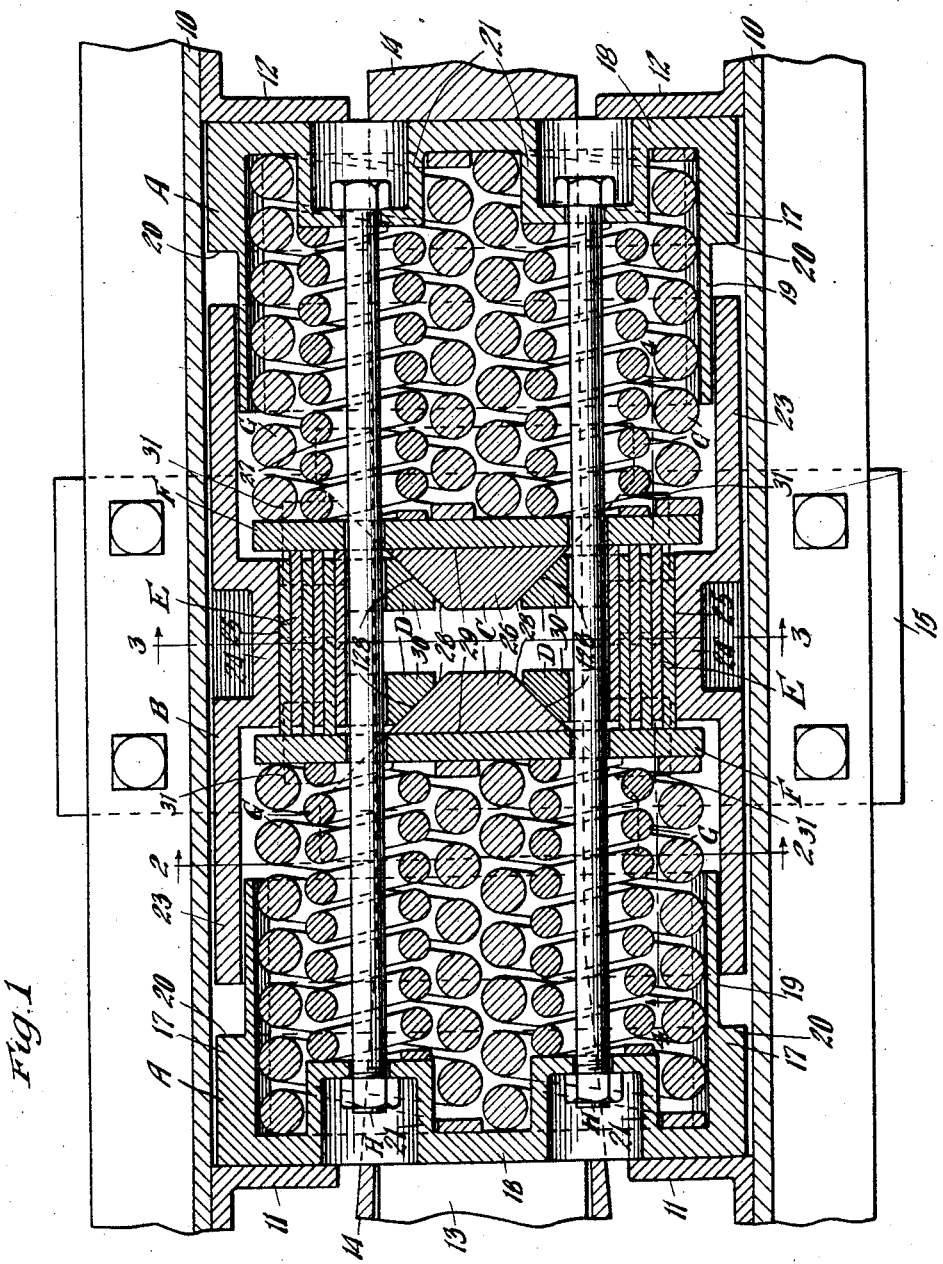

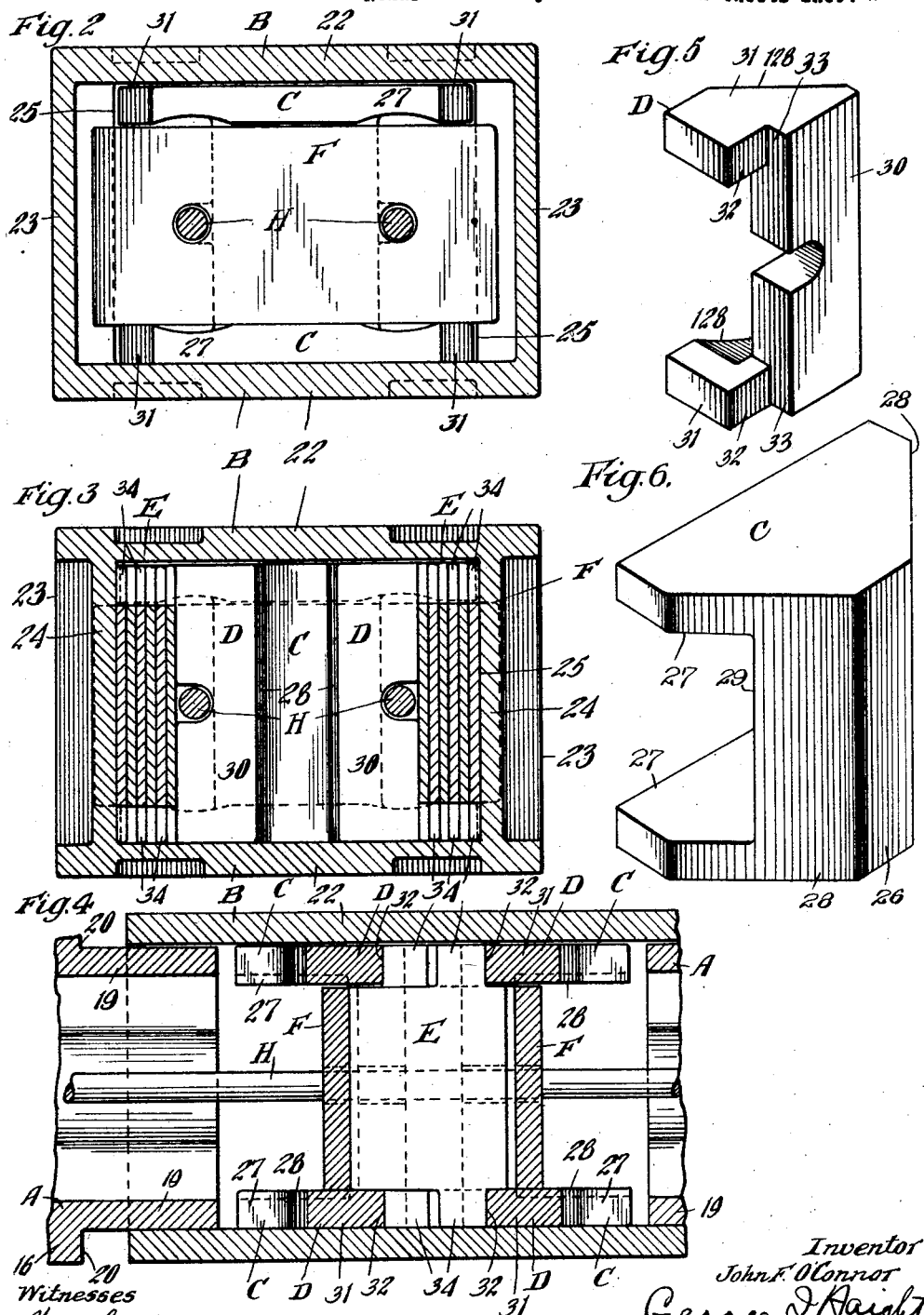

1,663,993

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 21, 1924, Serial No. 727,109. Renewed November 28, 1927.

This invention relates to improvements in friction shock absorbing mechanisms.

One object of the invention is to provide a high capacity shock absorbing mechanism, of the intercalated plate type, especially adapted for railway draft riggings, having initial spring action during which relatively light resistance is offered and heavy, high capacity during the remainder of the stroke, wherein the followers are returned to normal position directly by the expansion of the spring resistance elements, independently of the release of the various friction elements.

Another object of the invention is to provide a mechanism of the character indicated, including friction elements and spring resistance means, wherein the spring resistance is always available to absorb the shocks after each compression of the mechanism.

A more specific object of the invention is to provide a shock absorbing mechanism of the double ended type, including tandem arranged spring resistance elements, directly cooperating with the main followers, and a friction system interposed between the tandem springs and cooperating therewith, the friction system being directly actuated by relative movement of the main followers.

Other objects and advantages of the invention will more clearly and fully appear from the description and claims hereinafter following.

In the drawings, forming a part of this specification, Figure 1 is a longitudinal, horizontal, sectional view of a railway draft rigging showing my improvements in connection therewith. Figures 2 and 3 are transverse, vertical, sectional views of the shock absorbing mechanism proper, corresponding respectively to the lines 2—2 and 3—3 of Figure 1. Figure 4 is a longitudinal, vertical, sectional view, partly broken away, showing the central portion of the shock absorbing mechanism and corresponding substantially to the line 4—4 of Figure 1. Figure 5 is a detail, perspective view of one of the wedge friction shoes used in connection with my improved mechanism. And Figure 6 is a detailed perspective view of one of the wedge members employed in my improved mechanism.

In said drawings, 10—10 indicate channel-shaped, center or draft sills, of a railway car underframe, to the inner faces of which are secured front stop lugs 11—11 and rear stop lugs 12—12. A portion of the drawbar is indicated at 13 to which is operatively secured a hooded yoke 14. The shock absorbing mechanism proper, including the front and rear followers, are operatively supported within the yoke. The movable parts of the shock absorbing mechanism are supported by a detachable saddle plate 15.

The improved shock absorbing mechanism, as shown, comprises broadly, front and rear follower casings A—A; a friction shell B; front and rear main wedges C—C; front and rear pairs of friction wedge shoes D—D; two groups of friction plates E—E; front and rear spring followers F—F; front and rear sets of twin spring resistance elements G—G; and a pair of retainer bolts H—H.

The front and rear follower casings, which are of like design, are of rectangular box-like construction, open at their inner ends, comprising spaced, longitudinally disposed top and bottom walls 16—16, spaced, longitudinally disposed side walls 17—17 and a transverse, vertically disposed end wall 18. The top, bottom and side walls are reduced in thickness at their inner ends, as shown at 19, thereby providing continuous abutment shoulders 20. The transverse end wall 18 of each casing is provided with a pair of inwardly projecting hollow, spaced bosses 21, for a purpose hereinafter described.

The friction shell B, which is also of hollow box-like form, is provided with longitudinally disposed, spaced top and bottom walls 22—22 and spaced, longitudinally disposed side walls 23—23, the shell being open at its opposite ends. Midway between the ends of the shell, each side wall is inwardly offset as indicated at 24, the inner surface of the offset portion presenting a relatively short, longitudinally disposed, friction surface 25, adapted to cooperate with the outermost plate of the corresponding group of plates E. The opposite ends of the friction shell are adapted to telescopically receive the reduced portions 19 of the front and rear follower casings respectively, and the shell is of such a length that the opposite ends thereof are equally spaced from the shoulders 20 of the front and rear casings A, the spacing being such that the shoulders 20 will abut the opposite ends of the shell when the mechanism is fully compressed, thereby limiting the relative movement of the front and rear follower casings and transmitting the force directly through said follower casings and shell to one of the pairs of stop lugs.

The front and rear wedge members C are of like construction, each comprising a main block-like portion 26 and top and bottom, horizontally disposed, plate-like flange sections 27—27. Each of the wedge members is provided with a pair of inwardly converging wedge faces 28—28 at the inner end thereof, the wedge faces 28 being disposed on opposite sides of the central axis of the mechanism, and each adapted to cooperate with one of the friction wedge shoes D. The body portion of each wedge member is also provided with a flat end face 29 adapted to form an abutment for the corresponding spring follower plate F. The top and bottom flange sections 27 of each wedge member embrace the corresponding spring follower and have their extreme outer ends slightly spaced from the inner ends of the corresponding top and bottom walls of the adjacent follower casing A, as clearly shown in Figure 1. The space between each wedge member C and corresponding follower casing A permits of a predetermined amount of initial compression of the mechanism, after which the inner end of the follower casing A positively engages with the corresponding wedge C to actuate the latter.

The friction wedge shoes D are four in number, arranged in pairs, cooperating with the corresponding wedge members C. The shoes D are all of like construction, each shoe comprising a vertically disposed, heavy plate-like section 30 and horizontally disposed top and bottom flanges 31—31. The flanges 31, as clearly shown in Figures 2 and 5, project outwardly from the plate section 30 and are offset, as shown, presenting transverse abutment faces 32 and shoulders 33 at right angles thereto. On the inner side, the top and bottom flanges 31 of each shoe D are cut away to present wedge faces 128 correspondingly inclined to, and adapted to cooperate with, one of the faces 28 of the corresponding wedge member C. The top and bottom flanges 31 of the shoes are adapted to embrace the corresponding group of friction plates E, a shoe D being disposed at each end of each group of plates.

The friction plates E comprise two groups disposed at opposite sides of the mechanism, each group cooperating with the interior friction surface 25 of the shell B. Each group is composed of six like plates. As clearly shown in Figure 4, each plate E is provided with a pair of top and bottom lugs 34—34 near one end thereof, the lugs being slightly inset from said end. Alternate plates of each group are similarly arranged, three plates having their front ends abutting the inner face of the front spring follower F and the remaining plates of said group having their rear ends abutting the inner face of the rear spring follower F. The lugs 34 of the three plates abutting the front spring follower are engaged by the abutment faces 32 of the rear friction wedge shoe D on the corresponding side of the mechanism and the lugs 34 of the remaining three plates are in abutment with the shoulders 32 of the corresponding front friction wedge shoe.

The spring resistance elements comprise twin sets in tandem arrangement that is, the springs are arranged in front and rear sets, in longitudinal alinement, similar to the arrangement of the usual tandem spring gear, so that when the follower casings are moved toward each other the front and rear springs will be simultaneously compressed and each spring will be compressed to the extent of relative movement of the follower casings. Each twin arranged set of springs is disposed within one of the follower casings and is interposed between the same and the corresponding spring follower plate F. Each unit of the twin spring members comprises an outer, relatively heavy coil having its outer end bearing on the end wall of the corresponding follower casing A and its inner end bearing on the flat outer face of the corresponding spring follower F, and an inner, relatively light coil, having its outer end bearing on the corresponding hollow boss 21, of one of the casings A and the corresponding inner surface of the spring follower F. In this connection, it will be noted that the twin springs maintain each spring follower F in abutment with the outer transverse face 29 of the corresponding wedge C and bearing on the outer ends of three alternate plates of each group of plates E.

The retainer bolts H which are disposed at opposite sides of the longitudinal centre line of the mechanism, have their opposite ends anchored respectively in the corresponding bosses of the front and rear casings A. The retainer bolts serve to maintain the parts of the mechanism assembled and also hold them under initial compression.

As wear occurs on the various friction and wedge faces, compensation therefor is had by the expansion of the tandem arranged springs, which as hereinbefore pointed out are under initial compression, the wedge friction shoes being adapted to be forced outwardly of the mechanism, proper clearance being provided between the outer ends of the same, the corresponding ends of the plates carried thereby and the adjacent spring follower, to permit of this movement.

The operation of the improved shock absorbing mechanism is as follows, assuming an inward or buffing movement of the drawbar. As the drawbar 13 moves inwardly, the front follower casing A will be carried inwardly also, compressing the front set of twin springs, which in turn force the front spring follower F rearwardly, carrying the plates engaged thereby and the front wedge C therewith, the said plates in turn carrying the rear pair of shoes rearwardly and forcing them against the rear wedge C, movement of the latter being yieldingly resisted by the rear spring follower, which in turn is also forced rearwardly by the remaining friction plates, the latter being actuated by the front pair of shoes which are forced rearwardly by the front wedge C. Due to the friction resistance between the plates of the two groups and the shell B, the latter will be carried rearwardly with the plates. The front and rear spring followers, front and rear wedges, front and rear pairs of shoes, two groups of plates and the shell B will move as a unit, also compressing the twin springs G disposed within the rear follower casing A. It will be evident that a wedging action is also set up between the main wedges C and the corresponding pairs of friction wedge shoes D during the action just described, placing the friction plates under pressure and forcing the same against the shell walls. The relative approach of the front and rear follower casings A will continue until the inner ends of the respective follower casings come into abutment with the outer ends of the front and rear wedge members C, respectively, whereupon the wedge members C will be moved relatively toward each other, in unison with the follower casings, effecting relative movement of the front and rear pairs of friction wedge shoes D. As alternate plates of each group are anchored to the front friction shoes, and the remaining plates of the respective groups are anchored to the rear pair of friction wedge shoes D, the plates of the two groups will be moved relatively to each other, greatly augmenting the frictional resistance. At the same time, the front and rear spring followers F will be forced apart by the relatively movable plates, further compressing the front and rear sets of twin springs G. This action continues until the outer ends of the shell B and the shoulders 20 of the front and rear follower casings come into abutment, whereupon the forces will be transmitted directly through the casings and the shell to the rear stop lugs, as hereinbefore pointed out, thereby preventing the springs from being driven solid. During draft, the action is substantially the reverse of that just described, the front follower casing A being held stationary while the rear follower casing A is moved relatively thereto.

In release, the twin arranged springs at the front and rear end of the mechanism are free to expand immediately upon the reduction of pressure, and return the front and rear follower casings to their normal position independently of any releasing action of the friction wedge system. During the restoration of the front and rear follower casings, the inner ends of the same will be moved away from the cooperating ends of the wedge members C, thereby relieving the same of direct pressure from the follower casings, reducing the wedging pressure to permit release of the parts of the mechanism. Expansion of the front and rear sets of springs will carry the corresponding front and rear spring followers inwardly moving the corresponding plates therewith, which in turn carry the shoes anchored thereto outwardly, forcing the corresponding wedge C outwardly also, until movement of the latter is arrested by engagement with the inner face of the corresponding spring follower.

It will be evident that by my improved arrangement, not only restoration of the main spring followers is positively assured, but that the tandem arranged springs may function substantially independently of the wedge friction system, that is, if the friction wedge system should become jammed or stuck for any reason, the front and rear twin springs are available after each compression stroke to restore the front and rear casings to normal position and absorb the succeeding shock. It will also be evident that by my improved arrangement, I provide in addition to frictional resistance, the compression of the tandem springs from opposite ends, thereby greatly increasing the spring capacity of the gear.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with front and rear follower acting elements, relatively movable toward and away from each other; of tandem arranged springs interposed between said elements, and friction means interposed between said tandem arranged springs, said means including two sets of relatively movable friction plates and pressure transmitting members interposed between each of said follower elements and one of said sets of plates, said sets of plates cooperating respectively with the tandem arranged springs during relative movement of said plates, whereby said plates are actuated upon relative movement of said follower elements to compress said springs.

2. In a friction shock absorbing mechanism, the combination with front and rear follower acting means, relatively movable toward and away from each other; of front and rear spring resistance elements arranged in tandem, said front and rear spring elements being interposed between said follower-acting means, one of said spring elements being associated with each follower-acting means; and pressure transmitting means interposed between each follower-acting means and the inner end of the spring resistance element associated with the other follower-acting means, each pressure transmitting means including a plurality of friction plates, said plates of each pressure-transmitting means cooperating with the corresponding plates of the other pressure transmitting means.

3. In a friction shock absorbing mechanism, the combination with front and rear follower acting members, relatively movable toward and away from each other; of front and rear spring elements interposed between said follower-acting members; a plurality of relatively movable, longitudinally disposed, intercalated friction plates interposed between said front and rear spring elements, certain of said plates having their movement opposed by one of said elements and the remaining plates having their movement opposed by the other element; means for forcing said plates together, including a lateral pressure resisting member and a pair of relatively movable lateral pressure creating systems, said systems being actuated by the respective follower-acting members; and means for effecting relative movement of said plates upon relative movement of said systems.

4. In a friction shock absorbing mechanism, the combination with front and rear follower acting members, relatively movable toward and away from each other; of front and rear spring elements interposed between said follower-acting members; a friction shell interposed between said follower-acting members, said shell having longitudinally disposed interior friction surfaces; a plurality of relatively movable, longitudinally disposed, intercalated friction plates interposed between said front and rear spring elements and disposed within said shell, said plates being divided into groups disposed at opposite sides of the mechanism, each group comprising two sets of relatively movable plates, one set having its movement opposed by one of said spring elements and the other set having its movement opposed by the other spring element; spreading means between said group of plates for forcing the same against the friction surfaces of the shell, said spreading means including a pair of wedge shoes and a cooperating wedge member at opposite ends of said plates, said wedge members being actuated respectively by the front and rear follower acting members; and cooperating means on said shoes and plates for effecting relative movement of said sets of plates.

5. In a friction shock absorbing mechanism, the combination with front and rear followers, relatively movable toward and away from each other; of tandem arranged springs interposed between said followers; and means interposed between said springs and cooperating with the inner ends thereof, actuated by relative movement of said followers for forcing said springs apart, said means including a plurality of relatively movable friction plates.

6. In a friction shock absorbing mechanism, the combination with front and rear followers, relatively movable toward and away from each other; of front and rear spring elements interposed between said followers, one of said spring elements bearing on each follower; a wedge pressure transmitting member cooperating with each follower, a friction wedge shoe coacting with each wedge pressure transmitting member; a lateral pressure resisting member cooperating with said shoes and friction means carried by each of said shoes for transmitting the pressure from one of said followers to the inner end of the spring element bearing on the other follower, said friction means of each shoe cooperating with the friction means of the other shoe.

7. In a friction shock absorbing mechanism, the combination with front and rear followers; of a friction shell interposed between said followers, said shell having longitudinally disposed, opposed interior friction surfaces; a group of intercalated friction plates cooperating with each shell friction surface, each group comprising two sets of relatively movable friction plates; means for forcing said groups of plates against the respective friction surfaces, said means including wedge members coacting with each shell and a pair of friction shoes coacting with each wedge member; one pair of shoes coacting with one wedge member having engagement with corresponding ends of one set of plates and the other pair of shoes having engagement with the corresponding ends of the other set of plates; and yielding movement resisting means interposed between the remaining ends of each set of plates and the follower at the corresponding end of the mechanism.

8. In a friction shock absorbing mechanism, the combination with front and rear followers; of a friction shell interposed between said followers, said shell having longitudinally disposed interior surfaces; front and rear wedge members adapted to be actuated by the respective followers; front and rear pairs of wedge friction shoes cooperating with the respective followers; a group of friction plates interposed between each interior surface of the shell and the friction wedge shoes on the corresponding side of the mechanism, each group comprising relatively movable sets of plates, one set being anchored to the front shoes and the other set to the rear shoes at the corresponding side of the mechanism; and front and rear spring resistance elements cooperating with the respective sets of plates and coacting with the front and rear followers respectively.

9. In a friction shock absorbing mechanism, the combination with front and rear followers, of a friction shell interposed between said followers, said shell having its opposite ends normally spaced from the respective followers, and being provided with longitudinally disposed interior friction surfaces; front and rear wedge members adapted to be actuated by the respective followers, said wedge-members being normally slightly spaced from said followers to permit preliminary action of the mechanism; front and rear pairs of wedge friction shoes cooperating with the respective followers; a group of friction plates interposed between each interior surface of the shell and the friction wedge shoes on the corresponding side of the mechanism, each group comprising relatively movable sets of plates, one set being anchored to the rear shoes and the other set to the front shoes at the corresponding side of the mechanism; and front and rear spring resistance elements opposing movement of the respective sets of plates and coacting with the front and rear followers respectively.

10. In a friction shock absorbing mechanism, the combination with front and rear followers, of a friction shell interposed between said followers, said shell having longitudinally disposed, interior friction surfaces; front and rear sets of twin arranged springs interposed between said followers; two series of longitudinally movable plates, the plates of said two series being intercalated and each series of longitudinally movable plates cooperating with the inner ends of one of the sets of twin springs; a friction shoe having engagement with each set of plates to effect movement of the same; and a wedge engaging each friction shoe and cooperating with one of said followers.

11. In a friction shock absorbing mechanism, the combination with front and rear followers, of a friction shell interposed between said followers, said shell having longitudinally disposed, interior friction surfaces; front and rear springs interposed between said followers; a spring follower cooperating with the inner end of each of said springs; a plurality of relatively movable friction plates interposed between said spring followers, the front ends of alternate plates engaging one of said spring followers and the rear ends of the remaining plates engaging the other spring follower; and means for moving said plates relatively to each other and placing the same under lateral pressure, said means including wedge members adapted to be actuated by the front and rear followers respectively and friction shoes cooperating with said wedge members, each of said shoes being operatively connected to certain of the friction plates.

12. In a friction shock absorbing mechanism, the combination with front and rear followers, of tandem arranged spring elements interposed between said followers, said elements having their outer ends cooperating with the respective followers; and means for transmitting pressure from the front and rear followers to the inner ends of said spring elements respectively, said means including relatively movable friction plates, and means actuated by the respective followers for placing said plates under lateral pressure and moving the same relatively to each other longitudinally of the mechanism.

In witness that I claim the foregoing I have hereunto subscribed my name this 9th day of July, 1924.

JOHN F. O'CONNOR.